United States Patent
Huang

[11] Patent Number: 5,584,089
[45] Date of Patent: Dec. 17, 1996

[54] CD CASE WITH A PLATTER AND CLEANING MEANS DRIVEN BY A SINGLE DRIVING DEVICE

[76] Inventor: Kuan-Di Huang, 9F., No. 111-33, San Ho Rd., Sec. 4, San-Chung, Taipei Hsien, Taiwan

[21] Appl. No.: 594,178

[22] Filed: Jan. 31, 1996

[51] Int. Cl.[6] .................................................. G11B 3/58
[52] U.S. Cl. ...................... 15/97.1; 15/DIG. 14; 15/102; 369/72
[58] Field of Search ................................ 369/72; 15/97.1, 15/88.2, DIG. 14, 210.1, 268, 102

[56] References Cited

U.S. PATENT DOCUMENTS

| | | | |
|---|---|---|---|
| 4,520,470 | 5/1985 | d'Arc | 369/72 |
| 4,569,098 | 2/1986 | Kawabe | 15/268 |
| 4,641,391 | 2/1987 | De Brey | 15/268 |
| 4,654,917 | 4/1987 | Yeung | 15/97.1 |
| 4,662,025 | 5/1987 | Fritsch | 369/72 |
| 4,709,437 | 12/1987 | Hehn et al. | 369/72 |
| 4,750,231 | 6/1988 | Kogashiwa | 15/97.1 |
| 4,783,870 | 11/1988 | Yeung | 15/97.1 |
| 4,825,497 | 5/1989 | Nagao et al. | 369/72 |
| 4,854,001 | 8/1989 | Mannheimer et al. | 15/97.1 |
| 5,228,022 | 7/1993 | Compton et al. | 369/72 |

FOREIGN PATENT DOCUMENTS 05258522  10/1993  Japan ..................................... 369/72

*Primary Examiner*—John H. Wolff
*Assistant Examiner*—Kevin M. Watkins
*Attorney, Agent, or Firm*—Jacobson, Price, Holman & Stern, PLLC

[57] ABSTRACT

A compact disk case including a bottom shell, a cover shell hinged to the bottom shell, a platter mounted on the inside of the bottom shell to carry a compact disk, a rotary cap mounted on the outside of the cover shell, a driving device (for example, a handle) for turning the rotary cap, a driving wheel mounted on the inside of the cover shell and turned by the rotary cap, a driven wheel revolvably mounted inside the cover shell, a transmission gear meshed between the driving wheel and the driven wheel, and a cleaning element fixedly secured to the driven wheel and turned by the driving device through the rotary cap, the driving wheel, the transmission gear, and the driven wheel to remove dust from the compact disk.

4 Claims, 3 Drawing Sheets

5,584,089

CD CASE WITH A PLATTER AND CLEANING MEANS DRIVEN BY A SINGLE DRIVING DEVICE

BACKGROUND OF THE INVENTION

The present invention relates to a CD case for holding an individual CD (compact disk), and relates more particularly to such a CD case which comprises a platter mounted on the inside of the bottom shell thereof to carry a compact disk, a driven wheel, a cleaning element fixed to the driven wheel, a driving wheel, a transmission gear meshed between the driving wheel and the driven wheel, and a rotary cap mounted on the outside of the cover shell thereof and turned by a pivoted handle to rotate the driving wheel, causing it to turn the driven wheel so that the cleaning element is moved over the face of the compact disk to remove dust from it.

Regular individual CD (compact disk) cases are specifically designed for holding an individual CD. For cleaning CDs, CD cleaners may be used. However, regular CD cleaners, either hand-operated or motor-driven type, are commonly heavy, complicated, and expensive.

SUMMARY OF THE INVENTION

The present invention has been accomplished under the circumstances in view. It is one object of the present invention to provide a CD case which comprises a platter mounted on the inside of the bottom shell thereof for carrying an individual CD, and a cleaning device mounted on the inside of the cover shell thereof and turned to remove dust from the CD. It is another object of the present invention to provide a CD case with CD cleaning means which is compact and convenient for carrying. According to one aspect of the present invention, the compact disk case comprises a bottom shell, a cover shell hinged to the bottom shell, a platter mounted on the inside of the bottom shell to carry a compact disk, a rotary cap mounted on the outside of the cover shell, a driving wheel mounted on the inside of the cover shell and turned by the rotary cap, a driven wheel revolvably mounted inside the cover shell, a transmission gear meshed between the driving wheel and the driven wheel, and a cleaning element fixedly secured to the driven wheel and turned by the rotary cap through the driving wheel, the transmission gear, and the driven wheel to remove dust from the compact disk. According to another aspect of the present invention, a driving device is installed in the rotary cap and controlled to turn the rotary cap. According to still another aspect of the present invention, the driving device comprises a handle pivoted to a hole on the rotary cap, and turned between the operative position in which the handle is disposed in a vertical position perpendicular to the rotary cover for turning, and the non-operative position in which the handle is received in a groove on the outside of the rotary cover. According to still another aspect of the present invention, the driving device comprises a power supply unit, and a transmission element controlled by the power supply unit to turn the driving wheel.

DETAILED DESCRIPTION OF THE PREFERRED EMBODIMENTS

Figure 1:
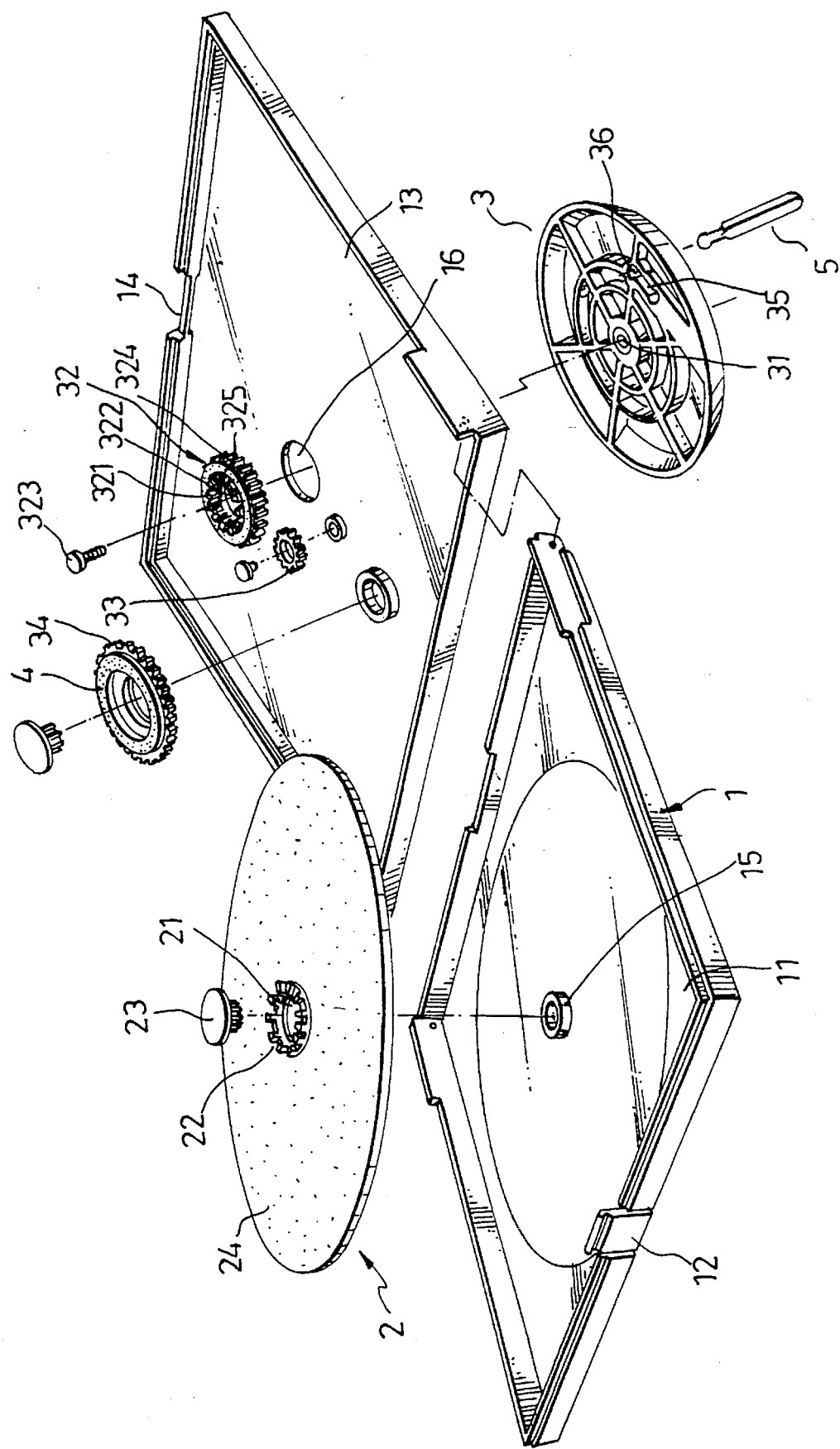
FIG. 1 is an exploded view of a CD case according to the present invention.
Figure 2:
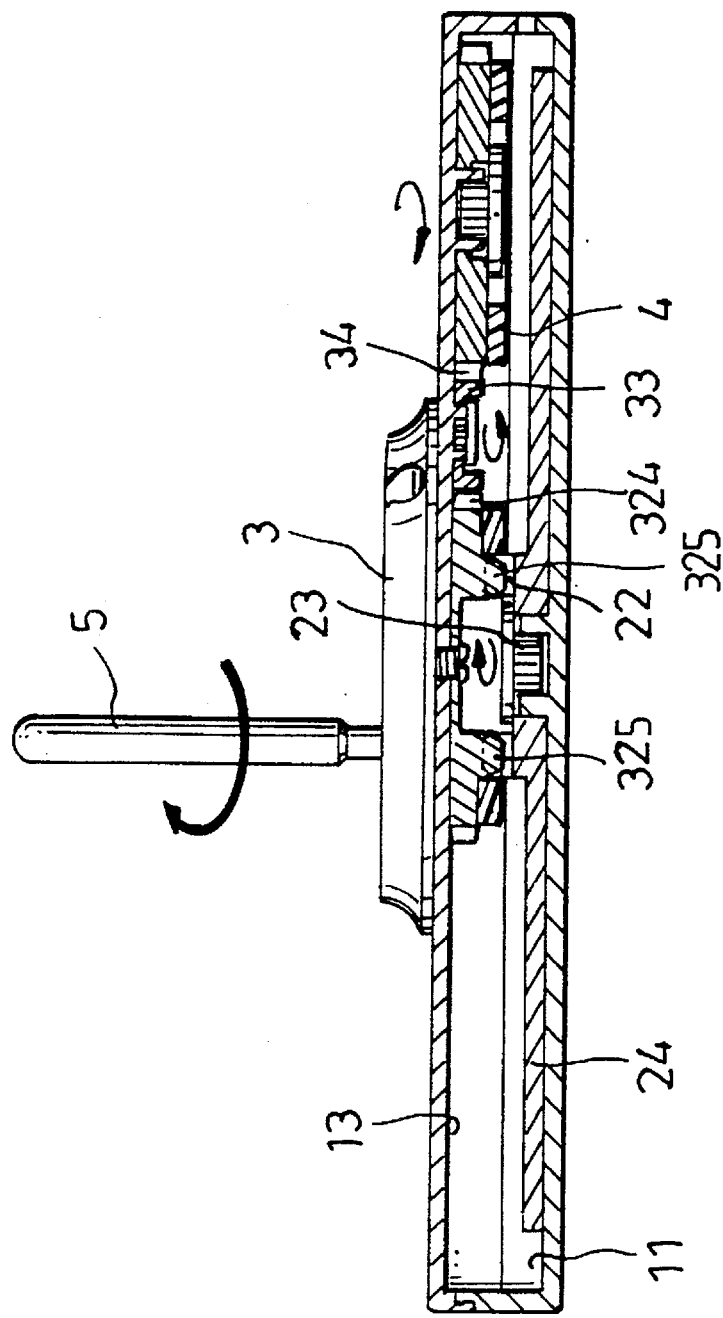
FIG. 2 is a sectional view showing the rotary cap turned by the handle, and the cleaning element rotated by the driven wheel.

Referring to FIGS. 1 and 2, a CD case in accordance with the present invention is generally comprised of a case body 1, a platter 2, a rotary cap 3, a cleaning element 4, and a driving device 5. The case body 1 is comprised of a bottom shell 11, and a cover shell 13 hinged to the bottom shell 11. The bottom shell 11 has a springy hook 12 at one side in the middle, and a hollow stub shaft 15 at the center. The cover shell 13 has a center hole 16 corresponding to the stub shaft 15, and a retaining portion 14 at one side in the middle for fastening to the springy hook 12 upon closing of the case. The platter 2 comprises a center hole 21, which receives the hollow stub shaft 15 of the bottom shell 10 a hub 22 with teeth mounted thereon disposed around the center hole 21 for holding a CD, a retainer 23 inserted through the center hole 21 and fastened to the stub shaft 15 to hold the platter 2 in place, permitting the platter 2 to be turned about the stub shaft 15, and a soft mat 24 at the top side (opposite to the bottom shell 11) for bearing the CD. The rotary cap 3 is mounted on the outside of the cover shell 13, having a screw hole 31 at the center. A driving wheel 32 is attached to the inside wall of the cover shell 13 and fixedly connected to the rotary cap 3 by a screw 323. The driving wheel 32 has a recessed center portion with a top flange 321 raised from the center of the top side thereof and inserted into the center hole 16, a center through hole 322 through the center of the top flange 321 for passing the screw 323, and a first toothed portion 324 around the outside periphery. A second toothed portion 325 is protruded upward around the periphery of the recessed center portion of the driving wheel 32 to couple with the teeth of the hub 22, when the case body 1 is closed. A driven wheel 34 is revolvably mounted on the inside of the cover shell 13 to hold the cleaning element 4. A transmission gear 33 is meshed between the driven wheel 34 and the toothed portion 324 of the driving wheel 32. The cleaning element 4 is made from fibers, and fixedly secured to the driven wheel 34. When the cover shell 13 is closed on the bottom shell 11, the cleaning element 4 is disposed in contact with the face of the CD. The driving device 5 is for turning the rotary cap 3. According to the embodiment shown in FIGS. 1 and 2, the driving device 5 is a handle pivoted to a hole 36 in a groove 35 on the outside of the rotary cap 3. When in use, the handle 5 is lifted from the groove 35 and turned to a vertical position perpendicular to the rotary cap 3 for turning the rotary cap 3 by hand. When not in use, the handle 5 is collapsed and received within the groove 35.

Figure 3:
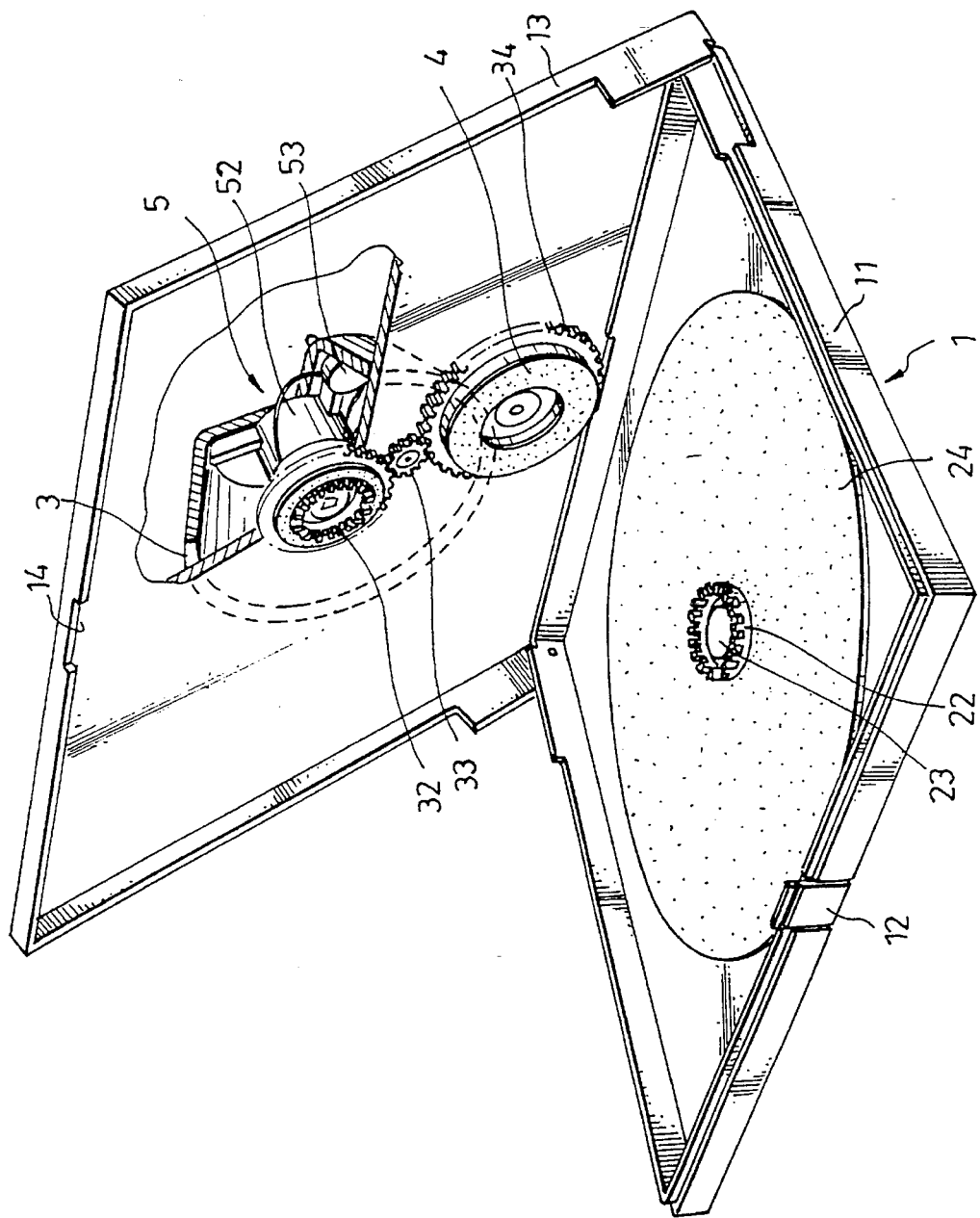
FIG. 3 is an exploded view of an alternate form of the CD case.

As an alternate form of the present invention, as shown in FIG. 3, the driving device 5 comprises a power supply unit 53, and a transmission element 52 controlled by the power supply unit 53 to turn the driving wheel 32.

Referring to FIG. 2 again, when the CD is loaded on the platter 2, the cover shell 13 is closed on the bottom shell 11 and retained in position by fastening the springy hook 12 to the retaining portion 14. When installed, the cleaning element 4 is disposed in contact with the face of the CD.

Referring to FIGS. 1 and 2 again, when the handle 5 is lifted from the groove 35, it is turned by hand to rotate the rotary cap 3, causing the driving wheel 32 to turn the platter 2 via the hub 22 and to turn the driven wheel 34 via the transmission gear 33, and therefore the cleaning element 4 is moved over the face of the CD to remove dust from it.

Referring to FIG. 3, when the power supply unit 53 is turned on, the transmission element 52 is turned to rotate the rotary cap 3, causing the driving wheel 32 to turn the platter 2 via the hub 22 and to turn the driven wheel 34 via the transmission gear 33, and therefore the cleaning element 4 is moved over the face of the CD to remove dust from it.

It is to be understood that the drawings are designed for purposes of illustration only, and are not intended as a definition of the limits and scope of the invention disclosed.

I claim:

1. A compact disk case comprising:

a case consisting of a bottom shell having a hollow stub shaft protruded upward at the center of said bottom shell, and a cover shell connected to said bottom shell having a first center hole corresponding to said hollow stub shaft;

a platter with a second center hole to receive said hollow stub shaft comprising, a hub with teeth mounted thereon disposed on top of said second center hole on one side of said platter; and a retainer inserted through said second center hole and fastened to said hollow stub shaft;

a driving wheel mounted on the inside of said cover shell having a recessed center portion, a first toothed portion disposed around the periphery of said driving wheel and a second toothed portion protruded upward around the periphery of said recessed center portion to couple with the teeth of said hub when the case is closed;

a driven wheel with a cleaning material secured thereon mounted on the inside of said cover shell at a distance from said driving wheel;

a transmission gear mounted on the inside of said cover shell and meshed between said driving wheel and said driven wheel; and a driving means fixed on said cover shell for providing power to drive said driving wheel, wherein said driven wheel is turned via the transmission gear and the driving wheel, therefore the cleaning material is moved over the face of a compact disk to remove dust.

2. The compact disk case of claim 1 wherein said driving means comprises a rotary cap mounted on top of said first center hole on the outside of said cover shell;

a handle pivoted to a hole on said rotary cap, said handle received in a groove on the outside of said rotary cap.

3. The compact disk case of claim 1 wherein said driving means comprises a power supply unit, and a transmission element controlled by said power supply unit to turn said driving wheel.

4. The compact disk case of claim 1 further comprising a soft mat covering said platter.

* * * * *